United States Patent
McCormack et al.

(10) Patent No.: US 8,396,921 B2
(45) Date of Patent: *Mar. 12, 2013

(54) CACHED AND SERVER VIEWS WITH AUTOMATIC CACHING AND SMOOTH SCROLLING

(75) Inventors: Michael J. McCormack, Snohomish, WA (US); Nicholas James Thomson, Redmond, WA (US); Dmitri Davydok, Bellevue, WA (US); Indrojit Deb, Sammamish, WA (US); David Robert Shutt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,509

(22) Filed: May 7, 2012

(65) Prior Publication Data

US 2012/0221632 A1  Aug. 30, 2012

Related U.S. Application Data

(63) Continuation of application No. 12/789,606, filed on May 28, 2010, now Pat. No. 8,195,741.

(51) Int. Cl.
*G06F 15/16* (2006.01)
(52) U.S. Cl. .......... 709/203; 709/217; 709/219
(58) Field of Classification Search .......... 709/203, 709/217, 219
See application file for complete search history.

(56) References Cited

U.S. PATENT DOCUMENTS

| | | |
|---|---|---|
| 5,864,854 A | 1/1999 | Boyle |
| 2003/0158916 A1 | 8/2003 | Cronin |
| 2007/0016915 A1 | 1/2007 | Mukundan et al. |
| 2008/0091774 A1* | 4/2008 | Taylor et al. .......... 709/203 |
| 2009/0070755 A1* | 3/2009 | Taylor et al. .......... 717/168 |
| 2009/0288035 A1 | 11/2009 | Tunning et al. |

OTHER PUBLICATIONS

"Description of Outlook 2003 with Cached Exchange Mode in an Exchange Server"—Microsoft® Support, Microsoft copyright 2012, 4 pages.
"How To Enable Cached Exchange Mode In Outlook"—Knowledge Base by Intermedia, Intermedia, Inc. copyright 1995-2012, 2 pages.
"Optimizing Outlook 2007 Cache Mode Performance for a Very Large Mailbox"—Microsoft Exchange, Microsoft copyright 2011, 7 pages.
"Turn on or off Cached Exchange Mode"—Microsoft Office, Microsoft Corporation copyright 2012, 4 pages.
Brinkman et al.; Firefox Cache Viewer Gui Frontend; Sep. 19, 2009; 2 pages.
Cache Critical Data ; Copyright 2010; 2 pages.
Mobile Computing; Copyright 2010; 1 page.

* cited by examiner

*Primary Examiner* — Mohamed Wasel
(74) *Attorney, Agent, or Firm* — Merchant & Gould

(57) ABSTRACT

On a client computer, customer relationship management software is integrated into a messaging application that includes a user interface. Customer relationship management (CRM) information is received from a server computer. An automatic determination is made as to whether the received CRM information is to be cached on the client computer. When it is determined that the CRM information is to be cached on the client computer, the CRM information is cached in a cache on the client computer. When at least some of the CRM information is cached on the client computer, the cached CRM information is displayed as a view on the client computer. The display of the CRM information is integrated into the user interface of the messaging application program.

20 Claims, 16 Drawing Sheets

| Cached Actions |
|---|
| Marking a View as a Favorite |
| Frequently Accessing a View |
| Executing a Cached Only Action on a Non-Cached View |

| Removing a Column | |
|---|---|
| Cached View | Non-Cached View |
| The column is removed from the view. | The column is removed from the view. |
| Email application grid remains in focus. | Email application grid remains in focus. |

FIG. 7

| Adding a Column | |
|---|---|
| Cached View | Non-Cached View |
| New data is retrieved from the server from the users current page. | The current page is refreshed and cached pages are maintained. |
| The user can continue to work while the new column data is retrieved. | The user can continue to work. |
| The users focus is maintained. | The users focus is maintained. |
| The column is added to the view. | The column is added to the view. |
| If the user scrolls to a new page, column data from the new page is prioritized over other pages. | |
| Required column information is retrieved until the cache is completed. | |

FIG. 8

| Filtering and Sorting on a Visible Column | |
|---|---|
| Cached View | Non-Cached View |
| The column is sorted or filtered using the cache. | A new page is obtained from the server computer. |
| The users focus is maintained. | The users focus may be lost. |
| Data removed from the view because of a filter remains in the cache. | |

Sorting, Grouping, Filtering or Arranging on an Invisible Column

| Cached View | Non-Cached View |
|---|---|
| New data is retrieved from the server from the users current page. | Instructions are sent to the server regarding sorting, grouping or filtering the invisible column. |
| The users focus is maintained. | A sorted, grouped or filtered page is obtained from the server. |
| The user can continue to work while the new column data is retrieved. | Focus is set to the first item listed on the page. |
| When the new column data is retrieved, the new column data is sorted, filtered, grouped or arranged. | |
| New column data is cached when the new column data is retrieved. | |

FIG. 10

| Searching | |
|---|---|
| Cached View | Non-Cached View |
| Searching is executed on the server. | Searching is executed on the server. |
| Grouping and arranging are disabled for the duration of the search. | Grouping and arranging are disabled for the duration of the search. |
| When the search is completed, the search result set is sorted, filtered or grouped. | When the search is completed, the search result set is sorted, filtered or grouped. |
| When sorting, filtering or grouping is completed, a new search may be executed. | When sorting, filtering or grouping is completed, a new search may be executed. |

FIG. 11

| Removing a Cached List |
|---|
| Unpinning a View |
| Irreconcilable View Change |
| Exceeding Disk Size Limitations |
| Exceeding Database Size Limitations |

| Conditions Causing Cache Updates |
|---|
| New View |
| Updated View |
| Deleted View |
| Changed View |
| Filter Operation Reset |
| When Polled |
| Manual Refresh |

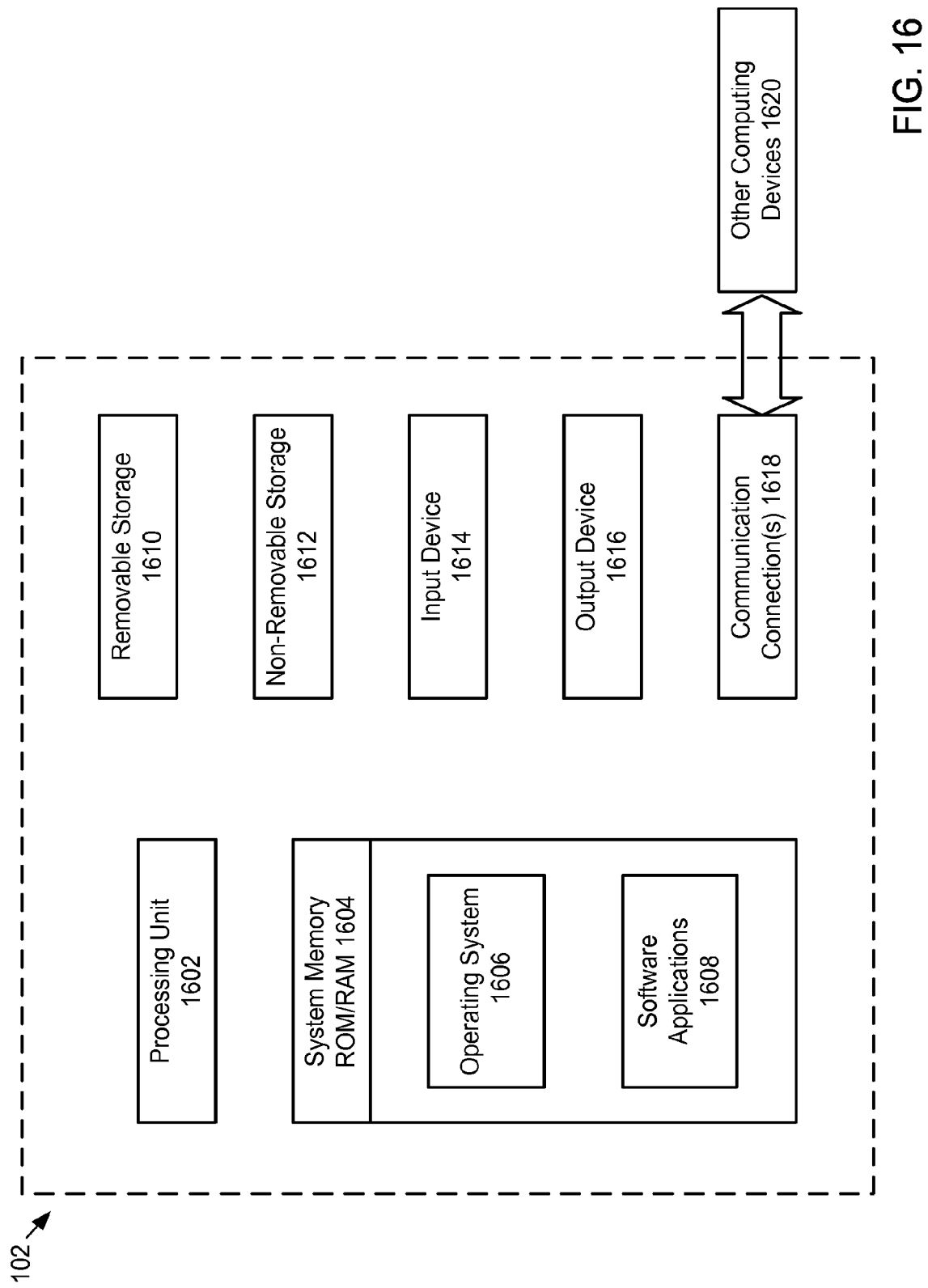

CACHED AND SERVER VIEWS WITH AUTOMATIC CACHING AND SMOOTH SCROLLING

BACKGROUND

Customer relationship management (CRM) provides a means for managing a company's interactions with clients and sales prospects and providing customer information regarding products, services and customer accounts. Server based customer relationship management software provides a business applications platform for customer relationship management, typically using a client/server model. Using a server based CRM system, a user at a client computer is able to access CRM information from a server computer and display CRM information at the client computer.

Client-based CRM software can be integrated into application software on a client computer, providing a user a commonly used platform from which to access CRM information. However, depending on the connectivity and bandwidth between a CRM server and a CRM client, performance issues can result. In addition, obtaining server-based CRM information via a client-based program may sometimes result in authentication issues, web browser errors and an unsatisfying user experience at the client computer.

SUMMARY

Embodiments of the disclosure are directed to a method implemented on a client computer for displaying customer relationship information on a messaging application. On the client computer, customer relationship management software is integrated into the messaging application. The messaging application includes a user interface. Customer relationship management (CRM) information is received from a server computer. An automatic determination is made as to whether the received CRM information is to be cached on the client computer. When it is determined that the CRM information is to be cached on the client computer, the CRM information is cached in a cache on the client computer. When at least some of the CRM information is cached on the client computer, the cached CRM information is displayed as a view on the client computer. The display of the CRM information is integrated into the user interface of the messaging application program.

The details of one or more techniques are set forth in the accompanying drawings and the description below. Other features, objects, and advantages of these techniques will be apparent from the description, drawings, and claims.

DESCRIPTION OF THE DRAWINGS

FIG. 5 shows a list of actions that cause CRM information to be cached at the client computer of FIG. 2.

FIG. 7 shows a table that lists example differences in the behavior of the email application for the client computer of FIG. 2 for cached views and non-cached views when a column is removed from a rendered display of CRM information at the client computer.

FIG. 8 shows a table that lists example differences in the behavior of the email application for the client computer of FIG. 2 for cached views and non-cached views when a column is added to a rendered display of CRM information at the client computer.

FIG. 9 shows a table that lists example differences in the behavior of the email application for the client computer of FIG. 2 for cached views and non-cached views when a visible column is filtered and sorted at the client computer.

FIG. 10 shows a table that lists example differences in the behavior of the email application for the client computer of FIG. 2 for cached views and non-cached views when an invisible column is filtered and sorted at the client computer.

FIG. 11 shows a table that lists example differences in the behavior of the email application for the client computer for cached views and non-cached views during a search operation at the email application for the client computer of FIG. 2.

FIG. 12 shows a table that lists example actions and conditions that cause a list of CRM information to be removed from the cache of the client computer of FIG. 2.

FIG. 13 shows a table that lists example actions and conditions that result in the cache for the email application on client computer being updated with new CRM information.

FIG. 16 shows example components of the client computer of FIG. 2.

DETAILED DESCRIPTION

The present application is directed to systems and methods for integrating CRM information into a client-based messaging application. A cache is used on the client computer to store certain CRM information retrieved from a server computer before the retrieved CRM information is displayed on the client computer. The cache is a memory area on the client computer that temporarily stores the retrieved CRM information before the CRM information is rendered on the client computer. A caching algorithm at the client computer determines which CRM information is cached and when. The CRM information is seamlessly integrated into a user interface of the client-based messaging application, providing smooth scrolling of CRM display screens. In addition, the caching of CRM information at the client computer improves response time for the display of CRM information at the client computer, particularly when the client computer is located remotely from a server computer that provides the CRM information.

CRM information typically includes information regarding customers, customer accounts, products, sales prospects, service issues and other related items. CRM information is commonly stored on a server computer and displayed as a web page in the form of lists. For example, a user running CRM software on a client computer may access a CRM web page from the server computer via a web browser on the client computer. The CRM web page may display a list of customers, a list of products, a list of service issues, etc. When CRM software is installed on the client computer and integrated into the client-based email application, the CRM information is rendered within the messaging application on the client computer instead of being rendered as a web page on the client computer.

Figure 1:
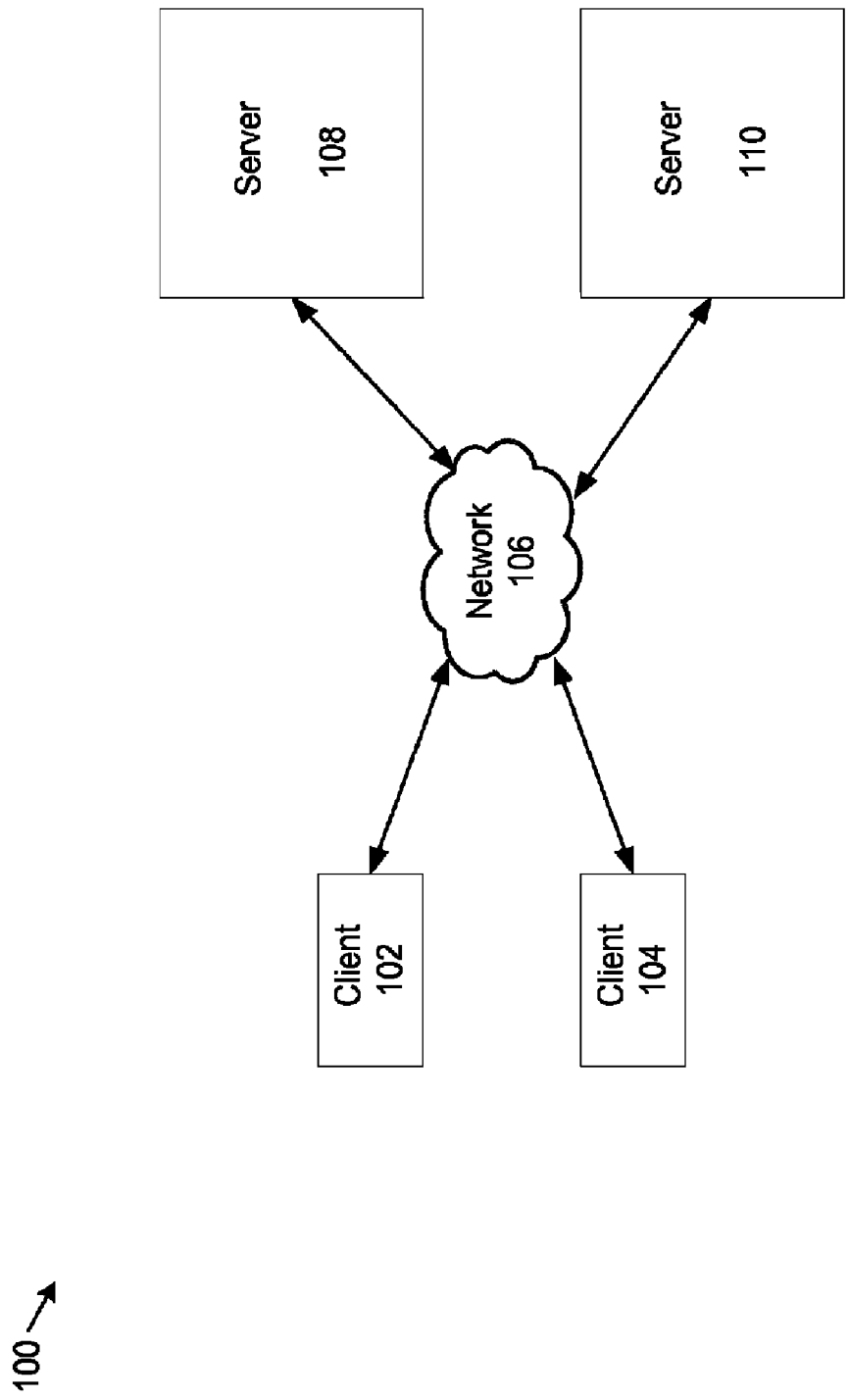
FIG. 1 shows an example system that supports automatic caching of CRM information and smooth scrolling at a client computer.

FIG. 1 shows an example system 100 that supports caching and smooth scrolling of CRM information at a client computer. The example system 100 includes client computers 102, 104, network 106 and server computers 108, 110. Client computers 102, 104 include software, such as Microsoft Office Outlook® 2007 messaging and collaboration software from Microsoft Corporation of Redmond, Wash., that provides email application software for client computers 102, 104. Server computers 108, 110 include CRM software such as Microsoft Dynamics® CRM 5.0 customer relationship management software from Microsoft Corporation of Redmond, Wash. that provides CRM functionality. An email application is one example of a messaging application. Files and data located on server computers 108, 110 are accessible to client computers 102, 104 through network 106. One example of network 106 is a corporate Intranet network. More or fewer client computers, networks and server computers may be used.

Figure 2:
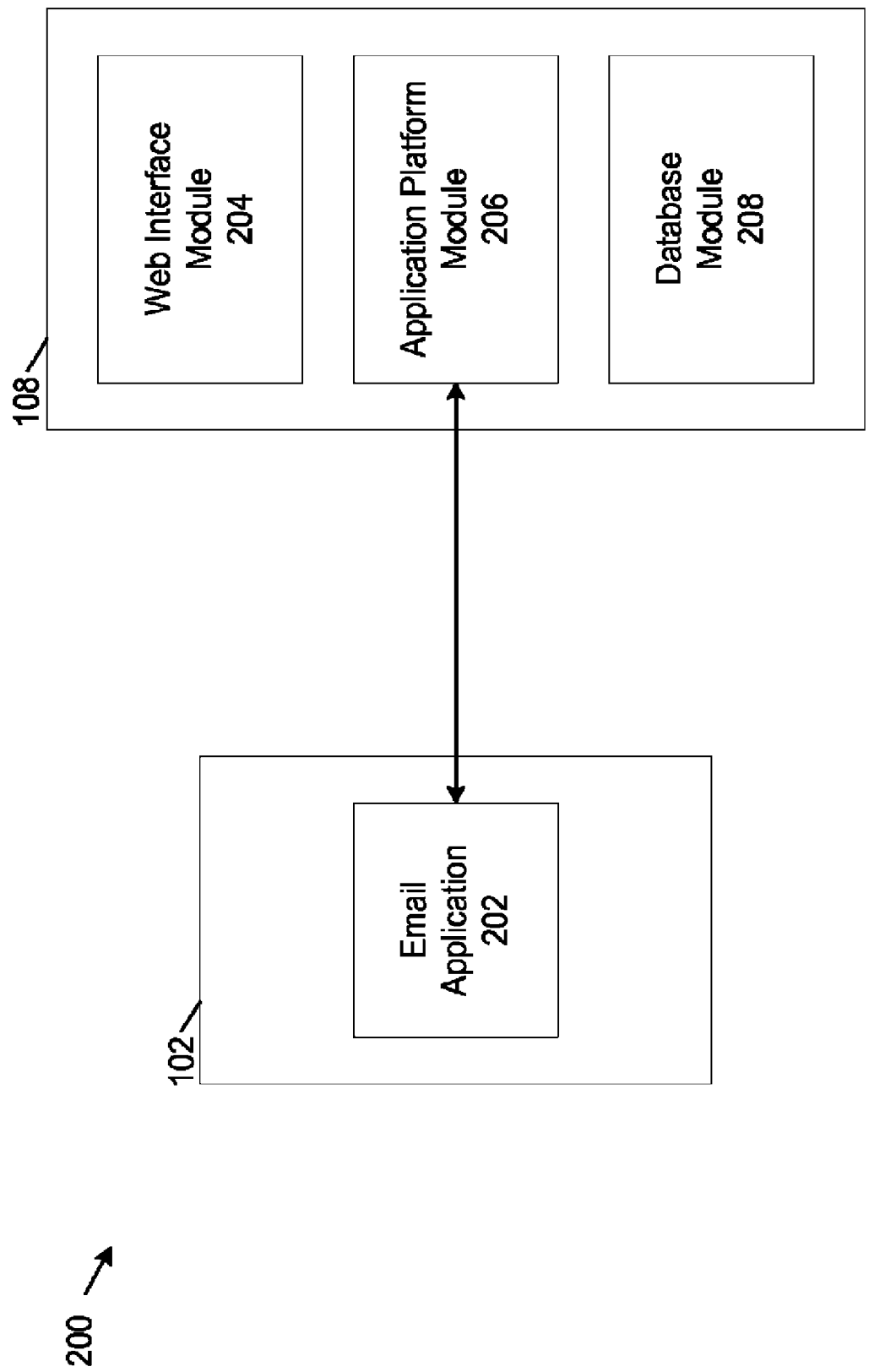
FIG. 2 shows example modules for a client computer and a server computer of the system of FIG. 1.

FIG. 2 shows a more detailed view of client computer 102 and server computer 108 of system 100. Client computer 102 includes an email application 202, for example Microsoft Office Outlook® 2007 messaging and collaboration software. The example email application 202 includes software, such as Microsoft Dynamics® CRM 5.0 for Outlook® customer relationship management software that integrates CRM functionality into the email application 202. The example server computer 108 includes a user interface module 204, an application platform module 206 and a database module 208.

The CRM software included on server computer 108, for example Microsoft Dynamics® CRM 5.0 customer relationship management software, includes a three-tiered architecture. A first tier, represented by the example user interface module 204 provides a user interface that includes a server-side script engine such as active server pages (ASP) or ASP.net, both from Microsoft Corporation of Redmond, Wash. The first tier is sometimes referred to as the presentation tier. The user interface also includes forms that permit a user to formulate search queries. A second tier, represented by application platform module 206 includes business logic and rules used to process requests for CRM information. Requests for CRM information are typically received over network 106 via web services. The second tier is sometimes referred to as the application tier. A third tier, represented by database module 208 includes a database in which CRM information is stored. An example database is the Microsoft SQL Server® 2008 database server from Microsoft Corporation of Redmond, Wash.

Using the client computer 102 and server computer 108 shown in FIG. 2, the example email application 202 communicates requests for CRM information directly to application platform module 206, bypassing the user interface module 204. CRM information is obtained from the applications module 206 via web services. Web services are application programming interfaces (APIs) that are used to obtain information from a remote server over a network, such as network 106. The applications platform module 206 includes a web services interface that provides an application program interface (API) for third parties such as email application 202.

The email application 202 uses web services to communicate requests to the example applications module 206 for CRM information. The email application 202 uses a messaging application programming interface to render the CRM information. An example application programming interface used with Microsoft Office Outlook® 2007 messaging and collaboration software is the Microsoft messaging application programming interface (MAPI). With MAPI, instead of displaying CRM information as web page on client computer 102, the CRM information obtained from server computer 108 via applications platform module 206 is integrated into the user interface of the email application 202, for example the Microsoft Office Outlook® 2007 messaging and collaboration software user interface. The integration of CRM information into a scrollable window of the email application 202 is described in more detail later in this disclosure.

Figure 3:
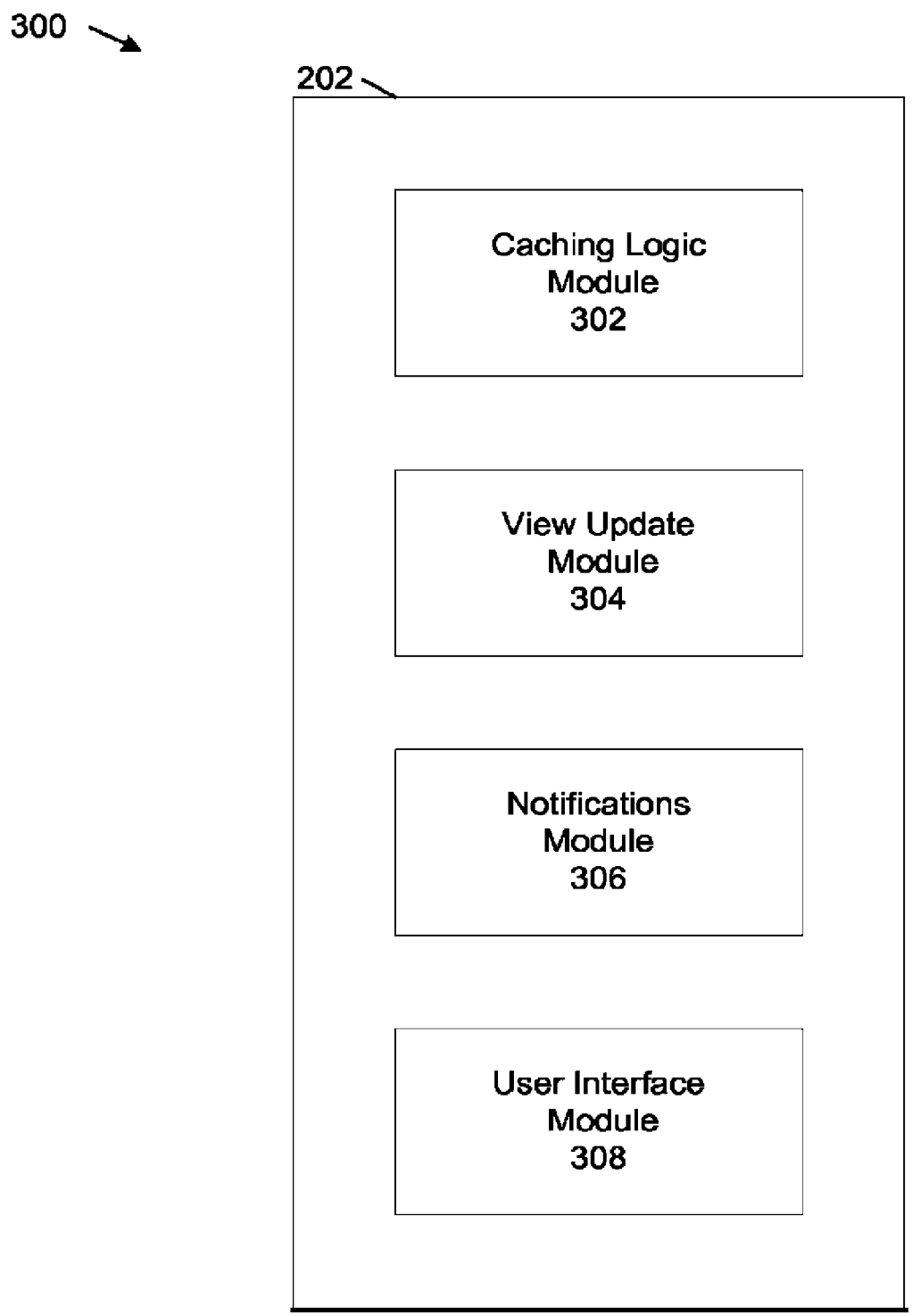
FIG. 3 shows example modules of an email application for the client computer of FIG. 2.

FIG. 3 shows example modules of the email application 202. The example email application 202 includes a caching logic module 302, a view update module 304, a notifications module 306 and a user interface module 308. In examples, the caching logic module 302, the view update module 304 and the notifications module 306 may be implemented separately from the email application on client computer 102.

The example caching logic module 302 implements a caching algorithm that automatically determines whether CRM information obtained from server computer 108 is to be cached on client computer 102 before the CRM information is displayed on client computer 102. CRM information that is not cached on client computer 102 is displayed on client computer 102 as a server view. In a server view, CRM information obtained from client computer 102 is displayed on client computer 102 directly without being cached. The caching algorithm is a set of rules implemented on client computer 102 and informed by settings or properties on server computer 108. The automatic determination as to whether CRM information is to be cached is based on the rules implemented in the caching algorithm.

The example view update module 304 processes changes that a user can make to a view. Some example changes that a user can make to a view include removing a column from a view, adding a column to a view, filtering and sorting on a visible column and filtering and sorting on an invisible column.

The example notifications module 306 processes notifications from the server computer 108 regarding server and cached views. A notification is an indication from the server computer 108 that new CRM information is available at the server computer 108. Typically, for server views, a page update is requested when a page of CRM information is processed at client computer 102. For cached views, a notification polling technique is used. With notification polling, the cache on the client computer 102 is periodically updated with CRM information. A typically polling interval is five minutes, although other polling intervals may be used. The notifications module 306 also notifies the email application 202 when CRM information is added to the cache, when CRM information is deleted from the cache and when CRM information stored in the cache is updated.

The example user interface module 308 provides a user interface for the email application 202. The user interface includes one or more grids in which email related information, including CRM information, may be displayed. A grid is an area of the user interface, typically a series of columns and rows, in which email messages, lists, etc. are displayed. Examples grids are described in FIG. 4 below.

Figure 4:
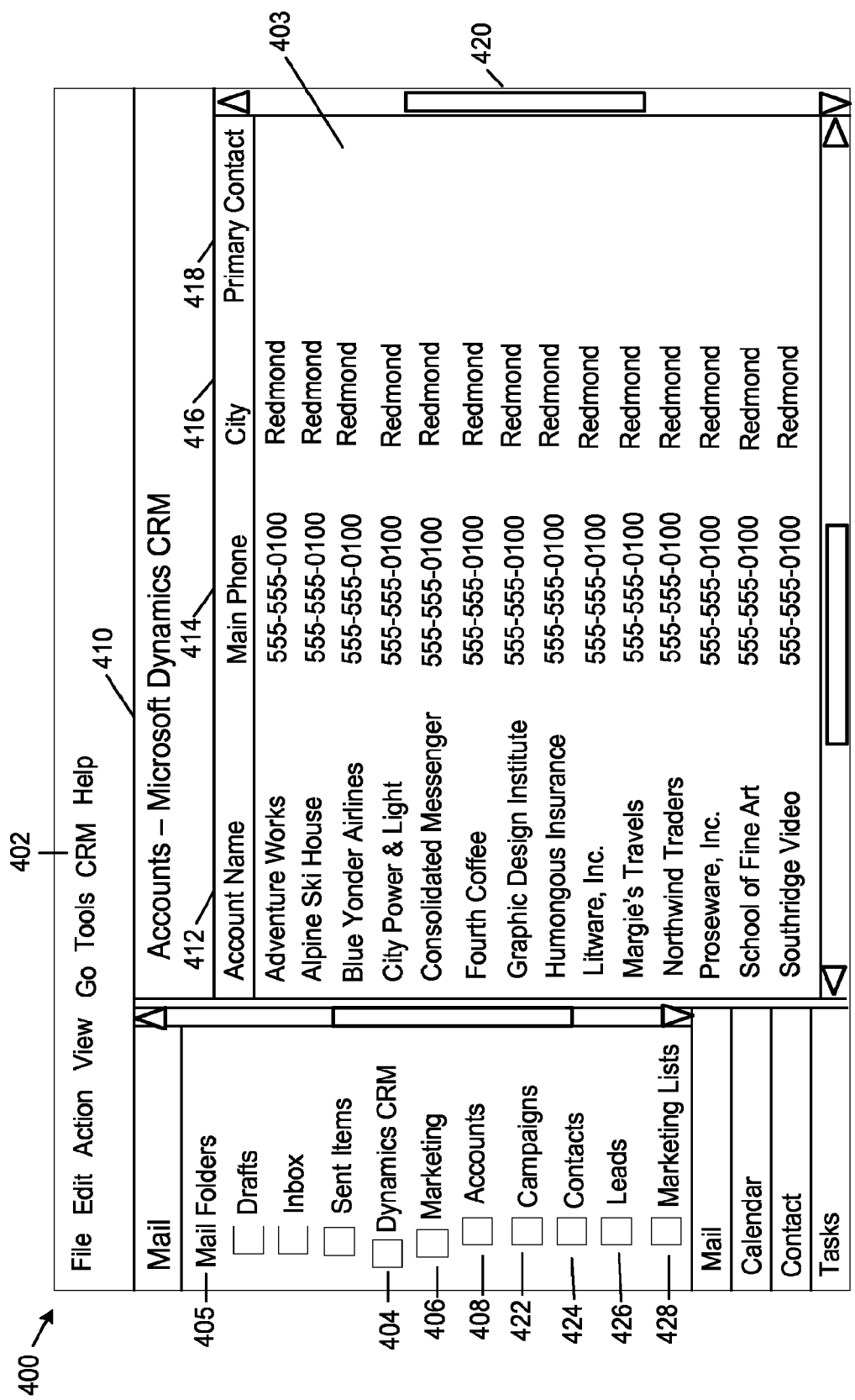
FIG. 4 shows an example user interface of the email application for the client computer of FIG. 2.

FIG. 4 shows an example user interface 400 displayed by email application 202. The example user interface 400 shows a CRM menu item 402 added to the menu of the email application 202. The example CRM menu item 402 is typically added during the installation of CRM application software, for example Microsoft Dynamics® CRM 5.0 for Outlook® customer relationship management software, for the email application 202. When the CRM application software is installed for the email application, in examples a Dynamics CRM folder 404 is added to the mail folders 405 grid on the email application 202.

The example Dynamics CRM folder 404 includes a marketing subfolder 406 and other subfolders not shown. For example additional subfolders may include a sales subfolder, a products subfolder, a services subfolder, etc. The example marketing subfolder 406 includes an accounts subfolder 408, a campaigns subfolder 422, a contacts subfolder 424, a leads subfolder 426, a marketing lists subfolder 428 and other subfolders not shown. Other folders and subfolders are possible.

When a user selects the accounts subfolder 408, an accounts summary screen 410 is displayed. The example accounts summary screen 410 displays a list of accounts information, including example fields of account name 412, main phone 414, city 416 and primary contact 418. The information in the accounts summary screen 410 is obtained from the CRM software application, for example Microsoft Dynamics® CRM 5.0, running on server computer 108. However, instead of displaying the information in the accounts summary screen 410 in a web browser, the accounts summary screen 410 is displayed in a grid 403 of the email application 202.

There can be advantages for displaying the information in the grid 403. For example, instead of having to manually select multiple pages of account summary screen information on a web browser, for example by clicking a next page button on the web browser, a user can simply scroll through the accounts summary screen 410 using example scroll bar 420. In addition, the native filtering aspects of the email application 202 can be used to re-sort or filter data shown in the different columns of the grid 403. In this manner, CRM information from server computer 108 is seamlessly integrated into the email application 202, providing smooth scrolling and displaying the CRM information in a user interface with which the user of the email application is familiar.

When a user selects the campaigns subfolder 422, a similar list of marketing campaign information is displayed on the user interface of the email application 202. The marketing campaign information is displayed in the same grid 403 on the email application 202 as the accounts summary screen 410. In a similar manner, when a user selects the contacts subfolder 424, the leads subfolder 426 or the marketing lists subfolder 428, CRM information corresponding to those folders is displayed in the same grid space on the email application 202. A scroll bar 420 permits a user to smooth scroll through the displays of CRM information.

Caching a view can improve performance on client computer 102 because CRM information is stored on client computer 102 and is available for rendering on the email application 202 without waiting for the CRM information to be retrieved from server computer 108. When a view is not cached, the view is retrieved from the server computer 108 each time the view is rendered. In this disclosure, non-cached views are also known as server views. Views that are not cached are rendered as server views.

For views that include a long list of CRM information, for example a list of customer contacts or a list of products, caching the view makes it possible to render the list in a scrollable window that is smoothly scrollable for a user. Using web services, the email application 202 obtains the size of the list from the server computer. The email application 202 uses the size of the list to determine how many items are to be displayed. For example, if the list contains 8,000 items and only 150 items can be displayed in one view, the email application 202 renders a scroll bar such that any of the 8,000 items may be displayed. For a cached view, the email application 202 obtains the CRM list information from the cache. When a user scrolls to a point in the list that is not currently stored in the cache, the email application 202 makes a request to server computer 108 via web services to obtain the CRM list information that is needed for display.

When CRM information is stored in the cache on client computer 102, if a cached view is selected, for example by selecting the accounts subfolder 408, the view is rendered from the cache rather than from the server computer 108. For example, if there are connectivity or bandwidth issues between server computer 108 and client computer 102, because CRM information is obtained and rendered from the cache, the user sees a faster response time than for a server view.

Server views are also rendered in a scrollable window in the email application 202. When a user scrolls to a portion of the view that is not currently displayed, the client computer 102 requests the CRM information for the portion of the view from the server computer 108. When the client computer 102 receives the CRM information for the portion of the view that is not currently displayed, the CRM information is displayed in the scrollable window. CRM information may be obtained from the server computer 108 out of sequence if, for example, the user scrolls past more than one page of CRM information, for example by scrolling to the bottom of the scrollable window.

In this manner, the user views CRM information in a scrollable window whether the CRM information is cached or not. Furthermore, the user is not required to manually click on a button to obtain a page of CRM information. The scroll bar acts as a paging control. The user simply scrolls to a portion of a view and CRM information is automatically and smoothly rendered for the view. The paging mechanism is transparent to the user.

FIG. 5 shows a list of actions 500 that cause CRM information from the server computer 108 to be cached at the client computer 102. The caching algorithm used in the example caching logic module 302 includes the list of actions in making a determination as to whether CRM information is to be cached. The actions include marking a view as a favorite, frequently accessing a view and executing a cached only action on a non-cached view. An example of marking a view as a favorite is pinning a view. In this disclosure, marking a view as a favorite is also referred to as pinning a view.

Pinning a view refers to a user selecting a frequently accessed view or a view that is important to the user and placing a pin device into the view. A pinned view is a favorite view of the user. The pin device is a graphical representation of a pin or a thumb tack that secures the view in place on the display screen of the email application 202. Pinning a view designates the view for caching on the client computer.

For example, a user may be a salesperson who has contacts in the states of Washington and Oregon. When the user presses the example contacts button 434 on example user interface 400, in examples tabs are displayed for several states including Washington and Oregon. The user may place pins on the tabs for Washington and Oregon to designate that these tabs are favorites. When a user selects the tab for Washington or the tab for Oregon, a list of contacts is displayed. When the tab is pinned, the list of contacts is obtained from the cache rather than from server computer 108. The cache receives periodic updates from the server computer 108. Also, at periodic intervals, the pinned view is updated from the cache.

Sometimes a user may pin a view that is a non-cacheable view. A view can be non-cacheable for various reasons. For a first example, an administrator may set up one or more views to be uncacheable for security reasons. As a second example, a server may have a particular size limitation in which caching is not permitted for a file above or below a particular size. A third example is when a view requires a server computer function before the view can be rendered.

For example, a view may display a list of customers that have not placed an order within the last six months. Because the server computer, for example server computer 108, executes a server-based function to determine which customers have not placed an order within the last six months, a request is sent to the server computer to display this information and the list information cannot be cached at the client computer 102. When the user pins a view that is non-cacheable, a notification, typically a message, is displayed on the user interface of the email application 202. In some examples a message is not displayed. However, pinning a non-cacheable view is non-blocking. This means that the view is still displayed even though the view is not cached. User actions are not blocked as a result of attempting to pin a view that is non-cacheable.

In addition to pinned views, frequently accessed views are also cached. A user may not be aware of pinned views or may not have the skill to use pinned views. The caching of frequently accessed views improves system performance for users who do not use pinned views. In examples, a frequently accessed view is a view that is accessed a certain number of times (e.g., three times) within a configurable time period (e.g., 72 hours). When the view is opened for the third time with the configured time period, the view is cached. The view needs to remain open for at least seven seconds each time the view is accessed in order that accidental clicks are not counted. When a frequently accessed view is cached, CRM information for the view from server computer 108 is stored in a cache and the view is rendered from the cache. Other methods for determining frequency can also be used.

Executing a cached only action on a non-cached view also causes a view to be cached. There are certain actions that can be performed at the email application 202, for example on Microsoft Office Outlook® 2007 messaging and collaboration software, that cannot be performed via the CRM software running on server computer 108. For example, when a view rendered at the email application 202 includes multiple value fields, the multiple value fields are typically sortable at the email application 202. For example, the example accounts screen summary 410 may be sortable by account name 412, main phone 414, city 416 or primary contact 418, etc. As other example, the email application 202 may provide the capability for grouping items. For example, email messages may be grouped by messages received yesterday, last week or last month. Whenever a user attempts to sort a multiple value field or attempts to group items in a view for a view which is non cached, the action of sorting or grouping causes the view to be cached.

When an attempt is made to cache a view and the view cannot be cached, the user is notified of the failed attempt at caching. The notification is typically an alert message on the user interface of the email application 202. When a view cannot be cached, CRM information is obtained from server computer 108 and a server view is rendered.

Figure 6:
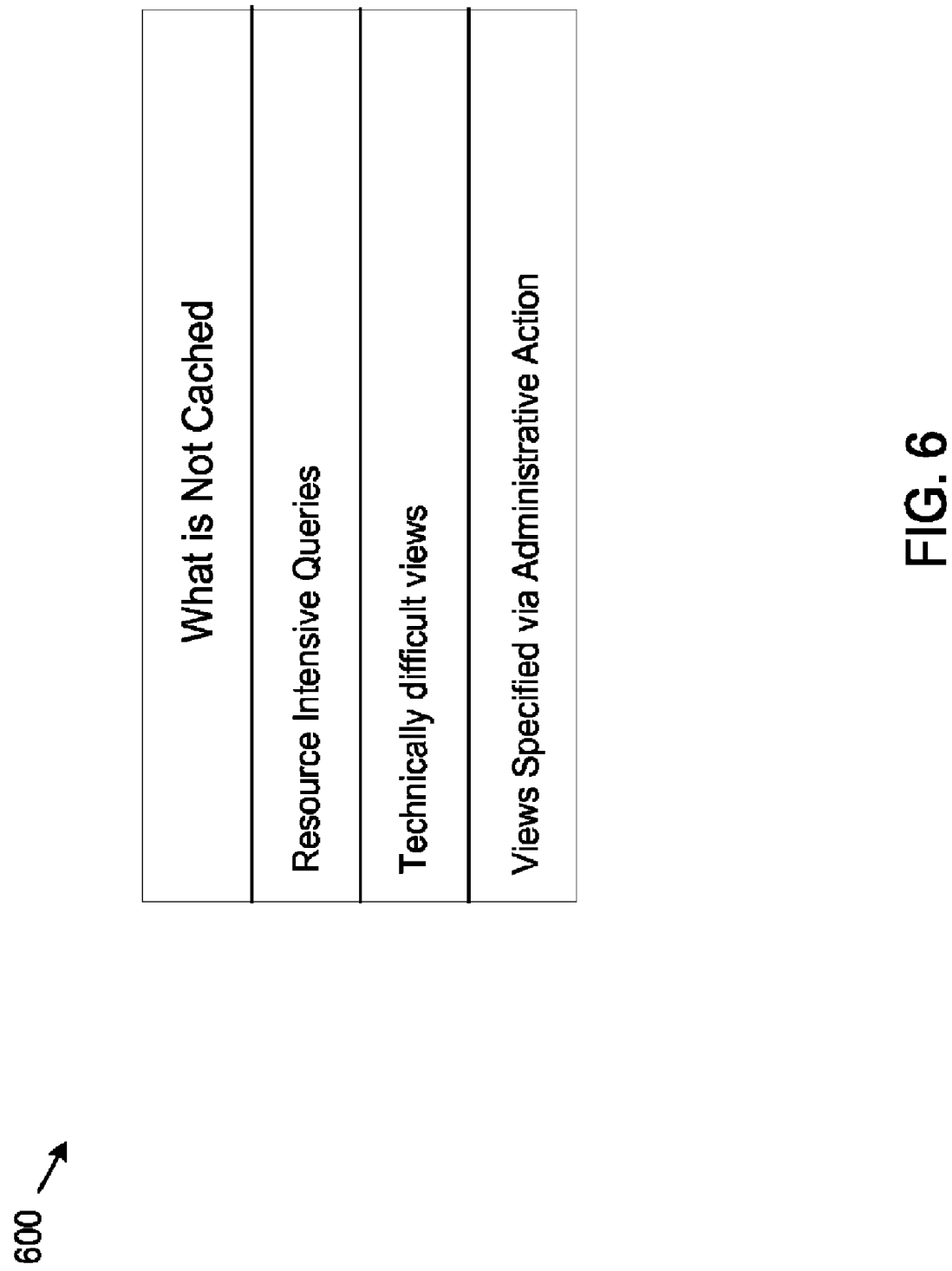
FIG. 6 shows a list of actions and views that are not cached at the client computer of FIG. 2.

FIG. 6 is a table 600 that shows a list of actions and views that are not cached. Actions and views that are not cached include resource intensive queries, technically difficult views and views specified as not to be cached by an administrator. In general, all views are cached except those views fitting into these three categories.

A resource intensive query is a query that is costly in terms of server resources. Whether a query is costly is determined by the amount of time a query takes to execute. A query which takes more than 45 seconds to obtain the first 5,000 bytes of CRM information from server computer 108 is considered a costly query. When it takes more than 45 seconds to obtain the first 5,000 bytes of CRM information from server computer 108, the CRM information is not cached at the client computer 102. However, when it takes 45 seconds or less to obtain the first 5,000 or less bytes of CRM information from server computer 108, the CRM information obtained from server computer 108 is cached at client computer 102, unless the CRM information is a technically difficult view or is specified as non-cacheable by an administrator. In examples, different values may be used for the time and size parameters used to determine whether CRM information can be cached.

When a determination is made not to cache CRM information because the time to obtain the first 5,000 bytes of CRM information is greater than 45 seconds, a random number between one and eight selected and an another attempt at caching is made N hours after the first attempt at caching, where N is the selected random number. When five attempts at caching fail, meaning that the time to obtain the first 5,000 bytes of CRM information is greater than 45 seconds for each attempt, the CRM information is displayed as a server view for one month. At the end of one month, another attempt is made to cache the CRM information from the query.

An example of a technically difficult view is a view that requires information from server computer 108 each time the view is rendered. Logic on server computer 208 may be used to obtain the CRM information in the view before the view is rendered on the email application 202. Because the CRM information for the view is obtained from the server computer 108 before the CRM information is rendered, there is no advantage to storing the CRM information in the cache.

In addition, administrators can configure the email application 202 to disable caching. Caching may be disabled completely on the email application 202 or caching may be disabled on a view by view basis. Administrators may configure the email application 202 to disable caching due to privacy concerns, for example to prevent the display of social security numbers or to comply with federal privacy regulations in HIPAA (the Health Insurance Portability and Accountability Act of 1996) or in SOX (the Sarbanes-Oxley Act of 2002). Administrators may also configure the email application 202 to disable caching due to performance concerns. Other reasons for an administrator configuring the email application 202 to disable caching are possible.

FIG. 7 is a table 700 that shows example differences in the behavior of the email application 202 between cached views and non-cached views when a column is removed from a rendered display of CRM information at client computer 102. The table 700 shows that for both cached and non-cached views, when a column is removed from a rendered display of CRM information, for both the cached view and the non-cached view, the behavior of the email application is the same. For each case, the user does not notice any difference in the behavior of the email application. The column is removed and grid of the email application 202 from which the column is removed remains in focus.

FIG. 8 is a table 800 that shows example differences in the behavior of the email application 202 between cached views and non-cached views when a column is added to a rendered display of CRM information at client computer 102. For a cached view, new column data is retrieved from the server computer 108. The new column data is retrieved from the current page displayed at the client computer 102. Even though the cache stores columns of CRM information currently displayed at client computer 102, CRM information for the added column is obtained from the server computer 108 and added to the cache. The user can continue to work while the new column data is obtained and the user focus on the current page of the email application 202 is maintained. When the column information for the current page is obtained, the column is added to the current page.

For a non-cached view, when a column is added to a view, CRM information for the added column is obtained from server computer 108 for the current rendered page. When a user scrolls to a new page, CRM information is obtained from the server computer 108 for the new page. Because CRM information is not cached, it generally takes longer to display CRM information for the non-cached view. In addition, for the non-cached view, CRM information for the added column is not obtained in advance. CRM information for the added column is obtained for the current view. The user can continue to work while CRM information is obtained.

However, the view currently displayed may include many pages of CRM information. Typically the client computer 102 retrieves one page of data for the added column for each request for CRM information from the server computer 108. Typically, each page of added column data is retrieved in sequence. However, a user may scroll to a page of CRM information for which the added column has not yet been obtained. For example, a user may scroll to the end of the accounts summary screen 410 before all pages an added column for the accounts summary screen 410 is retrieved from the server computer 108.

The performance characteristics of the client and server computers and the network conditions connecting the client computer and the server computer determine how long it takes to retrieve a page of data from the server computer. Depending on the performance characteristics and network conditions, a user may scroll to the bottom of a view of CRM information before the corresponding page of CRM information is retrieved from the server computer.

When the user scrolls to a page of column data that has not been retrieved, the page of column data takes priority over other pages of column data. For example, if the accounts summary screen 410 is constructed from eight pages of CRM information and added column data for only three pages has been retrieved, when a user scrolls to the end of the accounts summary screen 410, page 8 of CRM information for the accounts summary screen 410 is requested from server computer 108. When page 8 of CRM information is retrieved from server computer 108, the added column data from page 8 is smoothly integrated into the accounts summary screen 410.

FIG. 9 shows a table 900 that indicates example differences in the behavior of the email application 202 between cached views and non-cached views when a visible column is filtered and sorted at client computer 102. A visible column is a column that is rendered and displayed on the email application 202. Filtering a visible column refers to rendering only a subset of the CRM information for the column based on filtering criteria. For example, a user may wish to filter the accounts name 412 column to only display accounts that have been opened in the last 30 days. Sorting a visible column refers to ordering the column based on sorting criteria. For example, a user may wish to sort the accounts name 412 column so that the account names are in alphabetical order. Other examples of filtering and sorting are possible.

The basic distinction between filtering and sorting in a cached view in contrast to a non-cached view is that for the cached view, the filtering and sorting is performed on the email application 202 using CRM information stored in the cache. Thus, for example, when a user decides to filter the accounts name 412 column to only display accounts that have been opened in the last 30 days, the user selects the filtering criteria on the user interface of the email application 202 and the accounts name 412 column is filtered based on CRM information stored in the cache. When filtering or sorting occurs, the user's focus is maintained, meaning that the current page, for example the account summary screen 410, remains in the user's view while the filtering or sorting is occurring. Any CRM information removed from the view, for example accounts 30 days and older, remains in the cache.

For the non-cached view, the email application 202 informs the server computer 108 that a visible column is to be filtered and sorted and the server computer 108 performs the filtering and sorting. The user selects filtering and sorting criteria just as for the cached view, but for the non-cached view the filtering or sorting criteria are sent to the server computer 108, typically via a web services message. When the server computer 108 processes the filtering or sorting criteria, the server computer 108 sends the email application 202 an updated page of CRM information. The updated page of CRM information is rendered to incorporate the filtering and sorting criteria. When the updated page of CRM information is rendered on the email application 202, the rendered view, for example the accounts summary screen 410, and the user's focus on the rendered view, may be temporarily lost due to the time that it takes the server computer 108 to process the updated page of CRM information and send the updated page of CRM information to the email application 202.

FIG. 10 shows a table 1000 that indicates example differences in the behavior of the email application 202 between cached views and non-cached views when an invisible column is filtered and sorted at client computer 102. Some email applications, for example the Microsoft Office Outlook® 2007 messaging and collaboration software, permit a user to sort and filter on columns not visible in the current view. Typically, a user interface menu command permits the user to customize the current view, displaying in a dialog box columns not rendered in the current view. In addition, customizing the current view permits columns to be grouped by combining one or columns. For example, for a view displaying a list of marketing contacts, there may be an invisible column for the birthday of the each of the marketing contacts. If the marketing contacts are sorted by birthday, the birthday column can remain invisible.

When an invisible column is sorted, filtered or grouped for a cached view, CRM information for the invisible column is obtained from the server computer 108 and stored in the cache on client computer 102. The CRM information is obtained from the server computer 108 because the cache only stores information needed to render visible portions of the view. Therefore, information for the invisible column is not in the cache and needs to be obtained from the server computer 108. User focus on the current view, for example on the accounts summary screen 410 is maintained while the invisible column data is obtained from the server computer 108. The user can continue to work while the invisible column data is obtained. When the invisible column data is obtained and cached, the current view is sorted, filtered or grouped based the way in which the user customizes the current view.

When an invisible column is sorted, filtered or grouped for a non-cached view, instructions are sent to the server computer 108 regarding how an invisible column is to be sorted, filtered or grouped. The instructions are typically sent to the server computer 108 via a web services message sent from the client computer 102. When the server computer 108, receives the instructions, the server computer 108 performs sorting, filtering or grouping based on the instructions. The server computer 108 then sends a page of sorted, grouped or filtered CRM information to client computer 102 for rendering on the email application 202. The focus of the rendered page of CRM information is typically on the first item of the list rendered on the email application 202.

FIG. 11 shows a table 1100 that indicates example behavior for cached views and non-cached views for a search operation at the email application 202. Some email applications, for example Microsoft Office Outlook® 2007 messaging and collaboration software, permit searching for emails to or from selected individuals. For example a user may wish to locate all emails received from certain individuals for a specified range of dates. For both cached views and for non-cached views such search operations are performed on server computer 108. Email searches are performed on server computer 108 to ensure that a complete set of emails is searched. This is done because the cache may not include all the emails stored in the database available to server computer 108.

Because email searches are performed on server computer 108 for both cached views and non-cached views, search behavior is the same for both cached and non-cached views. When a search is executed on the server computer 108, grouping and arranging are disabled for the duration of the search. For a cached view, grouping and arranging make use of the cache. Because the cache is updated during the search, grouping and arranging are disabled until the search is completed. For a non-cached view, searching, grouping and arranging are performed on the server computer 108. Because it is desirable that any grouping or rearranging be performed on the search results, grouping and rearranging are disabled for the non-cached view until the search is completed.

FIG. 12 shows a table 1200 that lists actions and conditions that cause a list of CRM information to be removed from the cache. Actions and conditions that cause a list of CRM information to be removed from the cache include unpinning a view, making an irreconcilable view change, exceeding disk size limitations and exceeding database size limitations. Because pinning a view causes CRM information for the view to be stored in the cache, unpinning the view removes the CRM information from the cache. When the CRM information is removed from the view becomes a server view.

An irreconcilable view change is any view change that causes an update at the server computer 108 for the entire view. For example, if a complex change has occurred in a view, for example adding many columns or rows, and a determination is made at the email application 202 that CRM information for the entire view is to be obtained from the server computer 108, the view becomes a server view and CRM information for the view is removed from the cache. Once the view is updated, a determination is made as to whether the view is to be cached again. For example, when it is determined that the view is pinned, the updated CRM information for the view is cached.

An example size limitation on the disk drive of the client computer 102 is 1 gigabyte. An example size limitation for the example database module 208 is 4 gigabytes. In addition, an administrator may configure a size limitation for the disk drive or for the database module 208 that is lower than the actual size limitations of the disk drive and the database module 208. When the available disk space on the disk drive is within 100 megabytes of the actual size limitation or the lower size limitation configured by the administrator, the cache is aged and the oldest cached view is deleted from the cache on client computer 102. In examples, the cache may be aged when the available disk drive space is more or less than 100 megabytes of the actual size limitation or the lower size limitation configured by the administrator.

FIG. 13 shows a table 1300 that lists actions and conditions that result in the cache for the email application on client computer 102 being updated with new CRM information. Actions and conditions that result in the cache being updated with new CRM information are also referred to as notifications. The cache is updated whenever a new view is created, updated or deleted or when a view is changed. A view is updated whenever the user scrolls the view by using the example scroll bar 420, when a new column is added or deleted, or for a similar type action. A view is changed when a user selects a different type of CRM information to display, for example by selecting a different CRM folder, for example the campaigns folder 422, the contacts folder 424, the leads folder 426 or the marketing lists folder 428. When a view is changed, there is typically a short pause, for example 5 seconds, before the cache is updated.

The cache is also updated when a filtering operation is reset. A filtering operation is reset when a filter is no longer used. When a filter is no longer used a non-filtered view is rendered and information relating to the filtered view is no longer cached. In examples, the email application 202 periodically performs a query, typically every 15 minutes to determine whether a filter is still active. The 15 minute query interval is configurable.

The cache is also updated during a polling operation or during a manual refresh of the current view. Typically, the email application 202 uses a polled notification methodology. With polled notifications, cache updates are obtained periodically from the server computer 108, typically every 5 minutes. The polling interval is configurable. Manual updates occur when the user clicks a button having refresh functionality on the user interface of the email application 202.

Figure 14:
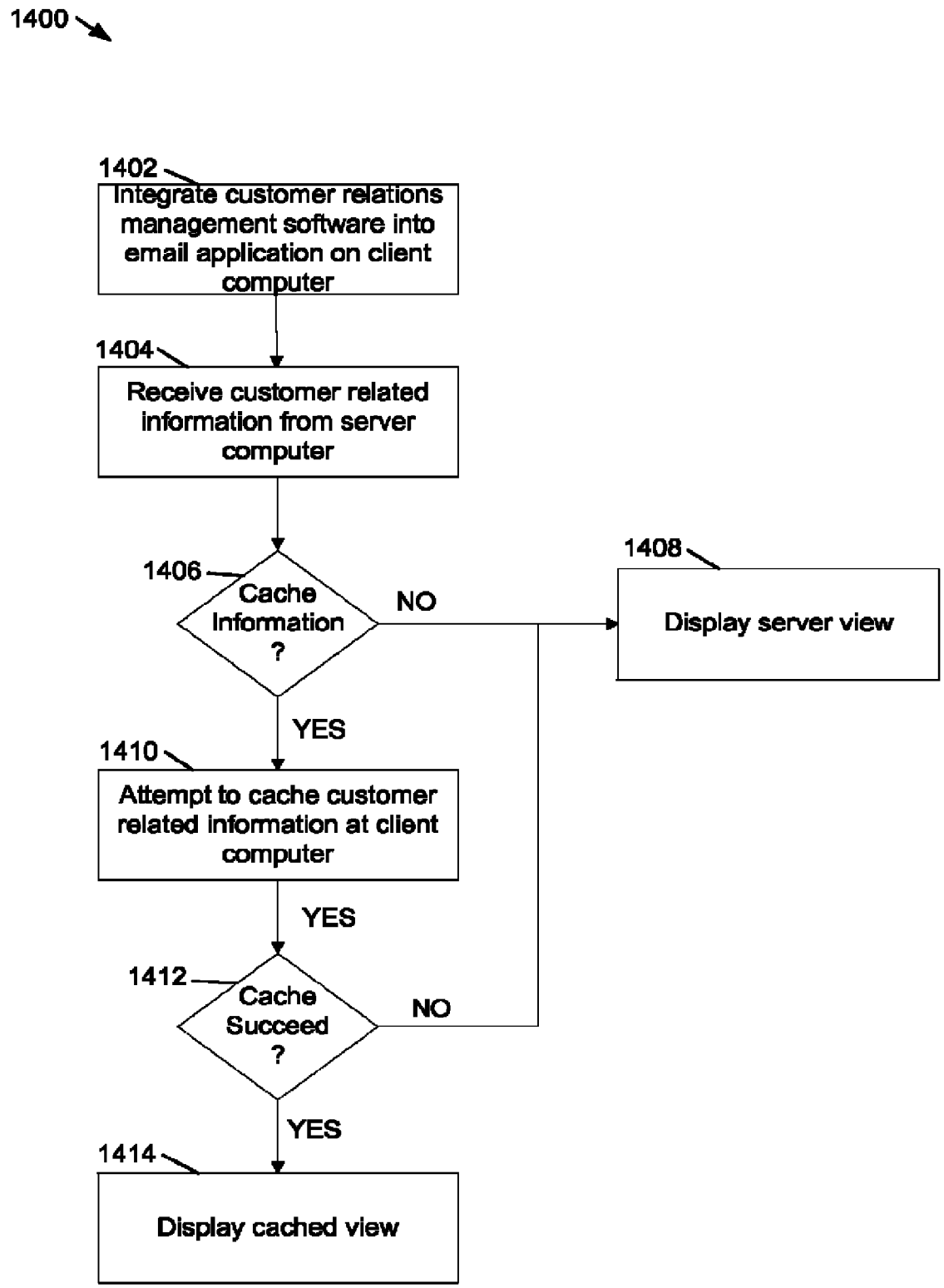
FIG. 14 shows an example flowchart for displaying CRM information in the email application for the client computer of FIG. 2.

FIG. 14 shows an example flowchart 1400 for displaying CRM information in an email application, for example email application 202, running on a client computer, for example on client computer 102. At operation 1402, CRM software is integrated into the email application. The integration of the CRM software into the email application typically comprises installing a plug-in module for the CRM software on the client computer. An example of an email application that runs of client computer 102 is Microsoft Office Outlook® 2007 messaging and collaboration software. An example of CRM software that can be installed via a plug-in module is Microsoft Dynamics® CRM 5.0 for Outlook® customer relationship management software.

When the CRM software is integrated into the email application at operation 1402, the CRM functionality is made available to a user of the email application. As shown in FIG. 4, example CRM functionality includes a CRM menu item 402, an example Dynamics CRM folder 404, example Dynamics CRM subfolders including an accounts subfolder 408, and example accounts summary screen 410. In examples, the accounts summary screen 410 is rendered when a user selects the accounts subfolder 408.

At operation 1404, CRM information is received from a server computer, for example from server computer 108. The CRM information is received when a user at the email application performs an action related to the display of CRM information. For example, when the user selects the example accounts subfolder 408, the email application requests CRM information from the server computer related to the accounts subfolder 408. The requested information is received at the client computer at operation 1404.

At operation 1406, a determination is made as to whether the received CRM information is to be cached at the client computer. The example caching logic module 302 automatically determines whether the received CRM information is to be cached based on a caching algorithm. Actions or conditions included as rules in the caching algorithm that determine whether received CRM information is to be cached include whether a user pins a view, whether a view is a frequently accessed view and whether a multiple value field in the view is grouped or sorted.

At operation 1406, when a determination is made that the view is not to be cached, at operation 1408, the view is displayed as a server view. When a view is displayed at a server view, all updates to the view are obtained from the server computer, for example from server computer 108, instead of being obtained from the cache.

At operation, 1406, when a determination is made that the view is to be cached, at operation 1410, an attempt is made to cache the received CRM information for the view. An attempt is made to cache the received CRM information because errors sometimes occur when storing information in a cache. The errors are typically related to the cache being at a predetermined size limit, although other errors, for example hardware errors can also occur.

At operation 1412, a determination is made as to whether the cache operation 1406 succeeded. At operation 1412, when a determination is made that the cache operation 1406 succeeded, meaning that the CRM information is stored in the cache, at operation 1414, the CRM information is displayed as a cached view. The cache is periodically updated from the server computer and the view is updated with CRM information obtained from the cache.

Figure 15:
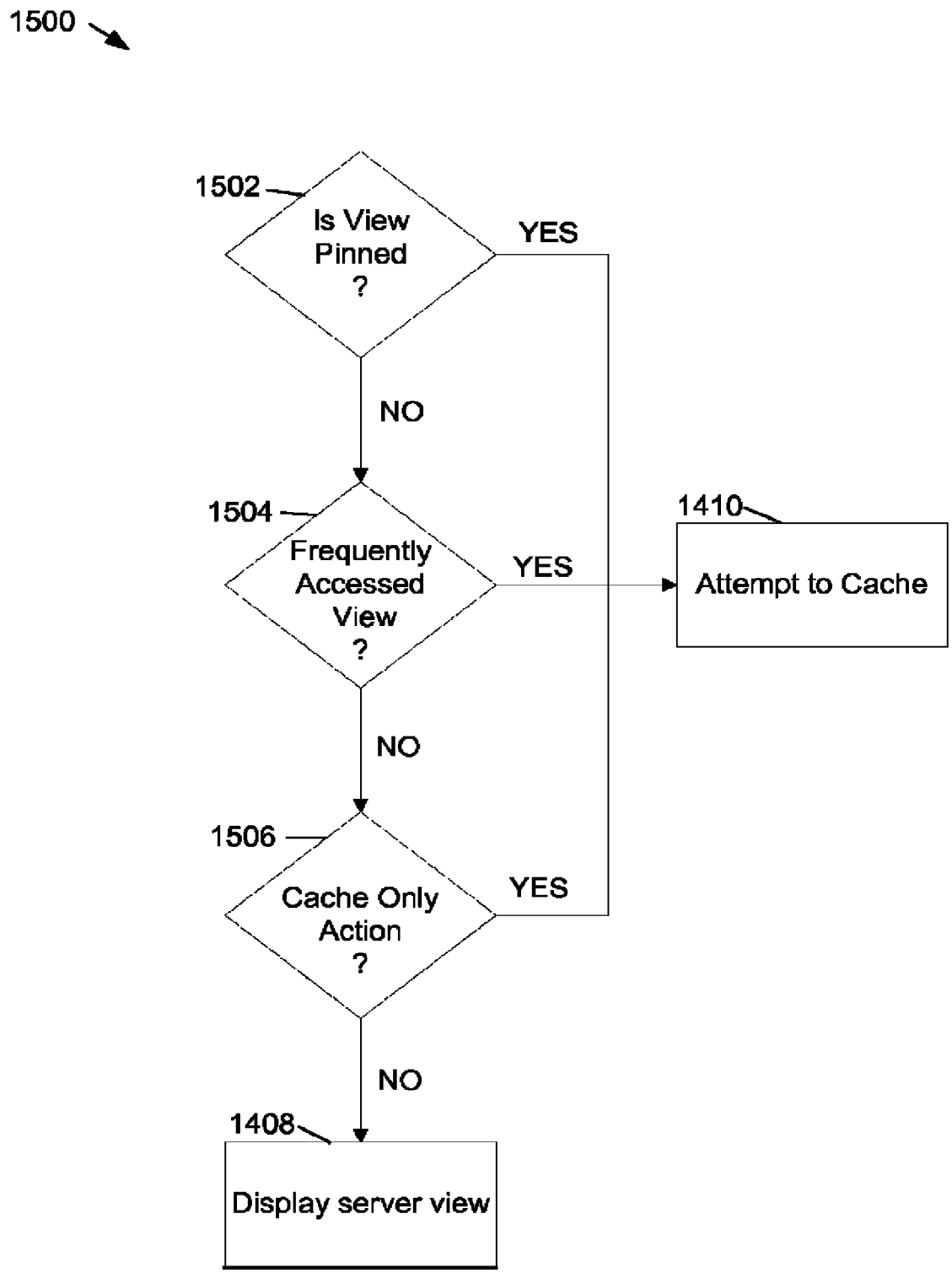
FIG. 15 shows an example flowchart indicating actions and conditions that cause CRM information to be cached.

FIG. 15 shows an example flowchart 1500 indicating actions and conditions that cause CRM information to be cached. The example flowchart 1500 describes operation 1406 in more detail. The actions and conditions that cause CRM information to be cached include pinning a view, frequently accessing a view and caching a view.

At operation 1502, a determination is made as to whether a view has been pinned. A view is pinned when a user attaches a graphical representation of a pin, thumbtack or similar pinning object to view. When it is determined at operation 1502 that a view has been pinned, at operation 1410 an attempt is made to cache the view.

At operation 1504, a determination is made as to whether a view is a frequently accessed view. In examples, a frequently accessed view is a view that has been accessed at least three times in a 72 hour period and in which the view is accessed for at least seven seconds each time. Accessing a view for at least seven seconds minimizing the possibility of false clicks, and thereby false determinations that a view is to be cached. The time period for which a view is accessed three times is configurable. When it is determined at operation 1504 that a view is a frequently accessed view, at operation 1410 at attempt is made to cache the view.

At operation 1506, a determination is made as to whether a cache-only action has been performed on a view. Examples of cache-only actions are grouping or sorting on a multiple value field in a view, filtering or sorting on a column in the view and adding a column to an already cached view. Other cache-only actions are possible. When it is determined at operation 1506 that a cache-only action has been performed on a view, at operation 1410, an attempt is made to cache the view.

In examples, when it is determined that a view has not been pinned per operation 1502, a view is not a frequently accessed view per operation 1504 and a view is not a cache-only view per operation 1506, at operation 1408 the view is displayed as a server view. When the view is obtained as server view, all updates for the view are obtained from the server computer, for example from server computer 108, rather than from the cache. Additional actions or conditions that cause a view to be cached are possible.

With reference to FIG. 16, example components of client computer 102 are shown. In example embodiments, the client computer is a computing device. The client computer 102 can include input/output devices, a central processing unit ("CPU"), a data storage device, and a network device. The other client computer 104 and the server computers 108, 110 can be configured in a similar manner.

In a basic configuration, the client computer 102 typically includes at least one processing unit 1602 and system memory 1604. Depending on the exact configuration and type of computing device, the system memory 1604 may be volatile (such as RAM), non-volatile (such as ROM, flash memory, etc.) or some combination of the two. System memory 1604 typically includes an operating system 1606 suitable for controlling the operation of a networked personal computer, such as the Windows® operating systems from Microsoft Corporation of Redmond, Wash. or a server, such as Microsoft Exchange Server 2007, also from Microsoft Corporation of Redmond, Wash. The system memory 1604 may also include one or more software applications 1608 and may include program data.

The client computer 102 may have additional features or functionality. For example, the client computer 102 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 16 by removable storage 1610 and non-removable storage 1612. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client computer 102. Any such computer readable storage media may be part of the client computer 102. Client computer 102 may also have input device(s) 1614 such as keyboard, mouse, pen, voice input device, touch input device, etc. Output device(s) 1616 such as a display, speakers, printer, etc. may also be included.

The client computer 102 may also contain communication connections 1618 that allow the device to communicate with other computing devices 1620, such as over a network in a distributed computing environment, for example, an intranet or the Internet. Communication connection 1618 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The various embodiments described above are provided by way of illustration only and should not be construed to limiting. Various modifications and changes that may be made to the embodiments described above without departing from the true spirit and scope of the disclosure.

What is claimed is:

1. A method implemented on a client computer for displaying customer relationship information on a messaging application, the method comprising:
   on the client computer, integrating customer relationship management software into the messaging application, the messaging application including a user interface;
   receiving customer relationship management (CRM) information from a server computer;
   caching the received CRM information in a cache on the client computer; and
   displaying the cached CRM information as a scrollable view on the client computer so that the CRM information is integrated into the user interface of the messaging application.

2. The method of claim 1, wherein integration of the CRM information into the user interface of the messaging application comprises displaying a CRM related folder and one or more CRM related subfolders in a first grid of the messaging application, the messaging application being an email application.

3. The method of claim 2, further comprising displaying a plurality of columns of CRM information in a second grid of the email application.

4. The method of claim 3, wherein the second grid includes a scroll bar for scrolling the CRM information displayed in the second grid.

5. The method of claim 1, further comprising:
   displaying two or more columns of the CRM information in a grid of the messaging application;
   removing a column of the CRM information from the grid; and
   maintaining a focus of the grid of the messaging application when the column of the CRM information is removed from the grid.

6. The method of claim 1, further comprising:
   displaying one or more columns of the CRM information in a grid of the messaging application;
   adding a column of the CRM information to the grid;
   maintaining a focus of the grid of the messaging application when the column of the CRM information is added to the grid.

7. The method of claim 6, further comprising:
   receiving a request to scroll the CRM information after the column is added to the grid;
   scrolling the CRM information until a new page of CRM information is displayed in the grid; and
   displaying the column in the new page of CRM information.

8. The method of claim 1, wherein displaying the cached CRM information further comprises:
   displaying one or more columns of the cached CRM information;
   sorting the cached CRM information in one of the columns; and
   maintaining a focus of the cached CRM information as the one column is being sorted.

9. The method of claim 1, wherein displaying the cached CRM information further comprises:
   displaying one or more columns of the cached CRM information;
   filtering the cached CRM information in one of the columns;
   displaying a subset of the cached CRM information in the column being filtered; and
   maintaining a focus of the cached CRM information as the one column is being filtered.

10. The method of claim 1, further comprising:
    sorting cached CRM information not currently being displayed; and
    maintaining a focus of the cached CRM information being displayed when the cached CRM information not currently being displayed is sorted.

11. The method of claim 1, further comprising:
    filtering cached CRM information not currently being displayed; and
    maintaining a focus of the cached CRM information being displayed when the cached CRM information not currently being displayed is filtered.

12. The method of claim 1, further comprising:
    prior to caching the received CRM information, processing a view as a favorite on the user interface.

13. The method of claim 1, further comprising:
    prior to caching the received CRM information, processing a user access of a view on the user interface a first number of times within a first time interval.

14. A computing device comprising:
    a processing unit;
    a system memory, the system memory including a cache that receives and stores customer relationship management (CRM) information obtained from a server computer, and the system memory encoding instructions that, when executed by the processing unit, cause the processing unit to create:
       an email application module that implements an email application on the computing device, the email application module including a user interface module that renders one or more views of CRM information in one or more grids of the email application;
       a view update module that processes changes a user makes to the one or more views of CRM information; and
       a caching logic module that caches CRM information obtained the from the server computer;
       wherein the user interface module renders the one or more views of CRM information in a scrollable window that is integrated into the grids of the email application in which the view is rendered.

15. The computing device of claim 14, wherein the view update module processes a removal of a column of CRM information from the one or more grids of the email application, the view update module maintaining a focus of the one or more grids when the column of CRM information is removed from the one or more grids.

16. The computing device of claim 14, wherein the view update module processes an addition of a column of CRM information from the one or more grids of the email application, the view update module maintaining a focus of the one or more grids when the column of CRM information is added to the one or more grids.

17. The computing device of claim 14, wherein the view update module sorts a column of CRM information, the view update module maintaining a focus of the column of CRM information when the CRM information is sorted.

18. The computing device of claim 14, wherein the view update module filters a column of CRM information, the view update module maintaining a focus of the column of CRM information when the CRM information is filtered.

19. The computing device of claim 14, wherein the view update module filters cached CRM information not currently being displayed, the view update module maintain a focus of CRM information being displayed when the cached CRM information not currently being displayed is filtered.

20. A computer-readable storage medium, wherein the computer-readable storage medium does not include a signal, comprising instructions that, when executed by a client computer, cause the client computer to:
    integrate customer relationship management software into an email application, the email application including a user interlace;
    receive customer relationship management (CRM) information from a server computer;
    cache the received CRM information in a cache on the client computer;
    display the cached CRM information in one or more grids of the email application, at least one grid of the email application including a plurality of columns of the cached CRM information, the at least one grid inluding a scroll bar for displaying the cached CRM information as a scrollable view, the display of the cached CRM information being integrated into the user interface of the email application;
    remove a first column of CRM information from the at least one grid, a focus of the at least one grid being maintained when the first column of CRM information is removed;
    add a second column of CRM information to the at least one grid, the focus of the at least one grid being maintained when the second column of CRM information is added;
    sort a third column of CRM information in the at least one grid, the focus of the at least one grid being maintained when the third column of CRM information is sorted; and
    filter a fourth column of CRM information in the at least one grid, the focus of the at least one grid being maintained when the fourth column of CRM information is filtered.

* * * * *